United States Patent
Calhoun

(10) Patent No.: US 7,961,550 B2
(45) Date of Patent: Jun. 14, 2011

(54) SYSTEMS AND METHODS OF PROCESSING IMPULSES INCLUDING BULLET PULSES AND/OR MUZZLE PULSES IN ASSOCIATION WITH TIME DOMAIN REPRESENTATIONS

(75) Inventor: Robert B. Calhoun, Oberlin, OH (US)

(73) Assignee: Shotspotter, Inc., Mountain View, CA (US)

( * ) Notice: Subject to any disclaimer, the term of this patent is extended or adjusted under 35 U.S.C. 154(b) by 114 days.

(21) Appl. No.: 12/203,141

(22) Filed: Sep. 2, 2008

(65) Prior Publication Data

US 2009/0122650 A1    May 14, 2009

Related U.S. Application Data

(60) Provisional application No. 60/968,888, filed on Aug. 30, 2007.

(51) Int. Cl.
*G01S 3/80* (2006.01)
(52) U.S. Cl. ...................................... 367/127
(58) Field of Classification Search .................. 367/906, 367/127, 129, 128, 136, 124; 702/71; 340/159, 340/573.1
See application file for complete search history.

(56) References Cited

U.S. PATENT DOCUMENTS

| | | | |
|---|---|---|---|
| 5,222,028 A | 6/1993 | LaBarre et al. | |
| 5,748,491 A | 5/1998 | Allison et al. | |
| 6,185,153 B1 | 2/2001 | Hynes et al. | |
| 7,203,132 B2 | 4/2007 | Berger | |
| 7,411,865 B2 * | 8/2008 | Calhoun | 367/127 |
| 7,474,589 B2 * | 1/2009 | Showen et al. | 367/127 |
| 7,599,252 B2 * | 10/2009 | Showen et al. | 367/127 |
| 2005/0137815 A1 | 6/2005 | Quinlan et al. | |
| 2006/0291331 A1 | 12/2006 | Wignall et al. | |
| 2007/0230270 A1 * | 10/2007 | Calhoun | 367/117 |
| 2008/0084788 A1 * | 4/2008 | Showen et al. | 367/127 |
| 2008/0279046 A1 * | 11/2008 | Showen et al. | 367/127 |
| 2009/0002494 A1 * | 1/2009 | Calhoun | 348/159 |
| 2009/0122650 A1 * | 5/2009 | Calhoun | 367/127 |
| 2010/0118658 A1 * | 5/2010 | Showen et al. | 367/127 |

FOREIGN PATENT DOCUMENTS

WO    WO 2009048500 A2 *    4/2009

OTHER PUBLICATIONS

International Search Report and Written Opinion, received in corresponding PCT application No. PCT/US2008/010336, filed Sep. 2, 2008.

* cited by examiner

*Primary Examiner* — Dan Pihulic
(74) *Attorney, Agent, or Firm* — DLA Piper LLP (US)

(57) ABSTRACT

Systems and method are disclosed for processing signals. In one exemplary implementation, a method may include transforming initial bullet data associated with one or more sensors into a set of discrete pulses, dividing the discrete pulses into pulse subsets, generating, for the subsets, time domain representations of the pulses, wherein the time domain representations include waveforms having pulse features, and processing the time domain representations to determine alignment between one or more of pulse features, pulses, pairs of channels, and/or pairs of sensors. One or more further implementations may include determining identity of pulses in association with a matching process performed as a function of the alignment, as well as, optionally, other pulse processing features/functionality.

47 Claims, 14 Drawing Sheets

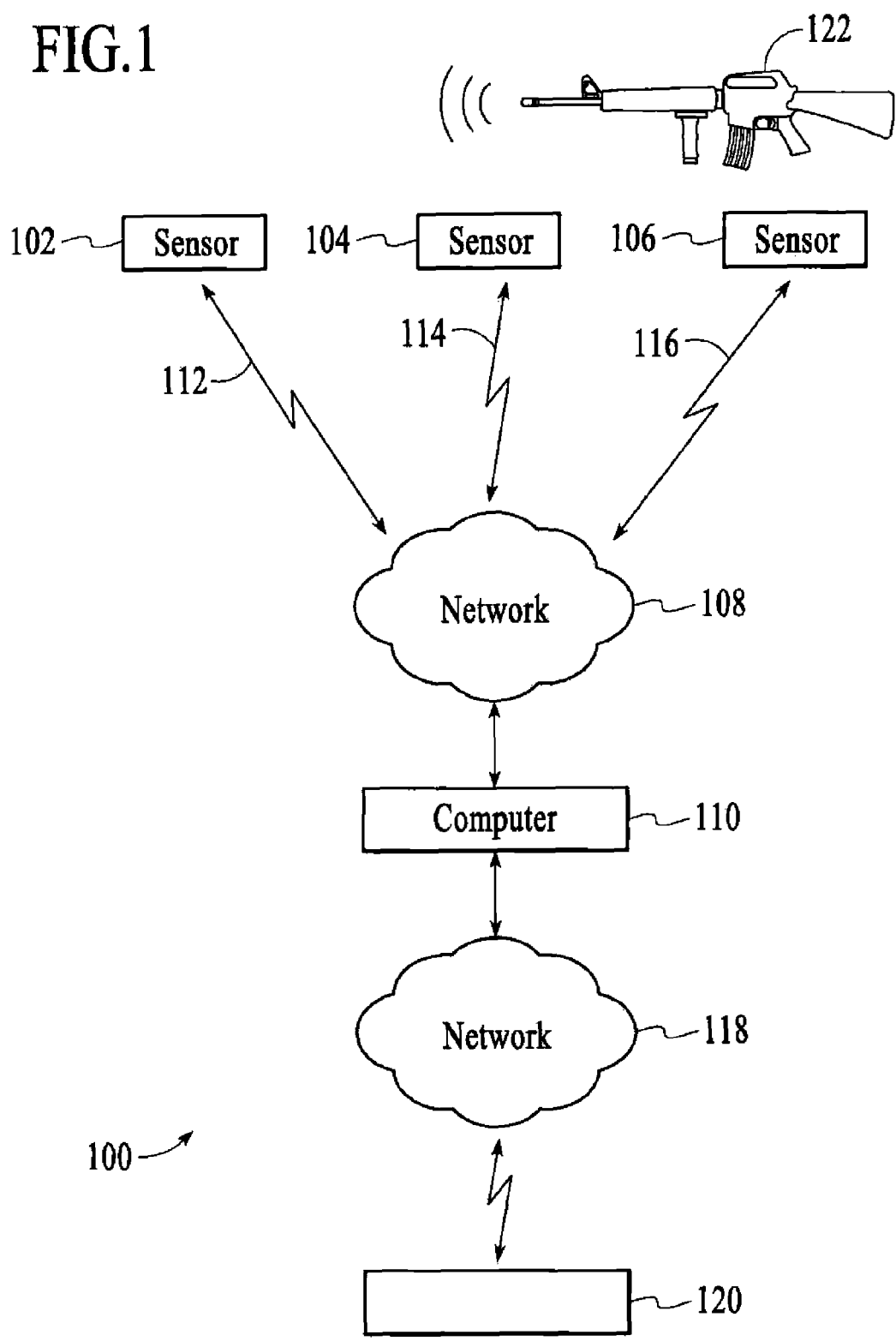

Combine with Waveforms from other channels

SYSTEMS AND METHODS OF PROCESSING IMPULSES INCLUDING BULLET PULSES AND/OR MUZZLE PULSES IN ASSOCIATION WITH TIME DOMAIN REPRESENTATIONS

CROSS-REFERENCE TO RELATED APPLICATION(S)

This application claims the benefit and priority of U.S. provisional application No. 60/968,888, filed Aug. 30, 2007, which is incorporated herein by reference in entirety.

BACKGROUND

1. Field

The present invention relates to processing impulses using time domain representations, and, more particularly, to systems and methods of processing acoustic impulses such as bullet pulses and/or muzzle pulses in association with time domain representations.

2. Description of Related Information

Impulse processing, such as that associated with acoustic gunshot location systems, typically detects the impulsive sounds generated by the passing of a supersonic projectile and/or those sounds generated by the muzzle blast of the gun. The relative times of arrival of these pulses are used to compute the location a variety of algorithms well-known to those skilled in the art. If the microphone position and arrival time of each pulse are accurately measured on several sensors and the correct set of pulses is picked for location, highly accurate location results can be obtained. However if incorrect pulses are selected and passed to the location algorithms (for example, trying to locating on three direct pulse and one echo pulse, or four pulses from the first shot in a three-shot incident and one pulse from the second shot), wildly inaccurate results are often obtained. Thus it is of vital importance to associate each pulse with a specific shot and use only the pulses generated by a specific shot in the process of locating where that shot was fired.

A particularly challenging case is that where multiple rounds are fired from a supersonic assault rifle, such as an AK-47 or M-16. These firearms are capable of firing a great number of high-velocity rounds each second. Because the bullets significantly exceed the speed of sound, they generate a supersonic shock wave as they travel, with the result that a sensor placed near the path of the projectile will pick up at least two pulses (i.e., one bullet pulse, followed later by a slower "sonic" muzzle pulse) for each shot fired.

While the muzzle pulse travels at a constant velocity (the speed of sound) from the shooter to the sensor, the bullet pulse follows a time-minimizing path that depends on the velocity of the projectile and the aim angle of the shooter with respect to the sensor. The time spacing between bullet and muzzle pulses can vary between 0 (when the shooter is firing perpendicular to the sensor) and the shooter-sensor spacing divided by the difference between the projectile velocity and the speed of sound (when the shooter is firing directly at the sensor.) Since the aim angle is different for each sensor in the array, the bullet-muzzle pulse spacing also differs on each sensor.

Selection of the correct pulse may be further complicated by the presence of spurious pulses from reverberation and echoes that are frequently found following both bullet and muzzle pulses. Finally, the direct path bullet or muzzle pulse may be absent from the acoustic signal entirely. For these reasons, inter alia, features and functionality consistent with determining the time offsets of each channel and thus determining which pulse are associated with each shot are significantly innovative in systems and methods that seek to accurately locate acoustic gunshots.

While there is no constant spacing between bullet and muzzle pulses from a given shot, the spacing between muzzle pulses is invariant when shooter and sensor are stationary. Further, the time difference on each channel is the same as the time difference between trigger pulls. (The spacing is slightly increased or decreased when shooter or sensor are in relative motion.) Similarly, the spacing between bullet pulses is invariant when shooter and sensor are stationary and the aim point of the shooter is fixed.

Even with automatic weapons, there are usually slight differences in the time between each shot. This is caused by the variable timing of the trigger pulls by the shooter or, in fully automatic mode, by self-heating and reduction in cleanliness of the weapon. The spacing between shots thus forms a fingerprint that can be used to align time domain signatures from different sensors when two or more shots are fired.

A standard technique for aligning two time-domain signals is to take their cross-correlation. The position for which the cross-correlation is maximized is the point of maximum similarity between the two signals. This is an effective technique when the microphones are close together (e.g., less than 10 ft) because the audio signals heard by the microphones are fairly similar. As such, this technique is frequently used to determine the relative times of arrival, and thus the azimuth of arrival, from sensors comprised of arrays of microphones.

Direct cross-correlation of the audio signals has many drawbacks and disadvantages, however, when the microphones are far apart as is the case in many practical gunshot location systems. These disadvantages may include, for example:

1. The time-domain signals from distributed sensors must be delivered to a common computational platform for cross-correlation. Because of the size of the audio signals, this is expensive in terms of communication bandwidth.
2. Signals from the same weapon discharge may sound very different on different sensors. For example, one sensor might detect a gunshot through the a copse of trees while another gets a direct signal across a field. Such disparate signals, collected at a wide variety of distances to the shooter, frequently do not cross-correlate well.
3. Because bullet-muzzle spacing varies on each sensor depending on its position relative to the shooter and the shooter's aim point, direct cross-correlation of audio signals involving bullet and muzzle pulses will always yield poor results.

In sum, there is a need for solutions that may adequately process acoustic signals and overcome such drawbacks, for example, systems and methods that require less communication bandwidth, less processing power, and/or perform better than those using existing processing/correlation techniques.

SUMMARY

Systems and methods consistent with the innovations herein are directed to processing acoustic impulses.

In some exemplary implementations, there are provided systems and methods of processing gunshot information. Moreover, one exemplary method may include transforming initial bullet data associated with one or more sensors into a set of discrete pulses, dividing the discrete pulses into pulse subsets, generating, for the subsets, time domain representations of the pulses, wherein the time domain representations include waveforms having pulse features, and processing the time domain representations to determine alignment between one or more of pulse features, pulses, pairs of channels, and/or pairs of sensors. One or more further implementations may include determining identity of pulses in association with a matching process performed as a function of the alignment, as well as, optionally, other pulse processing features/functionality.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings:

FIG. 1 is a diagram of an exemplary signal processing system/environment, consistent with certain aspects related to the innovations herein.

DETAILED DESCRIPTION

Figure 2A:
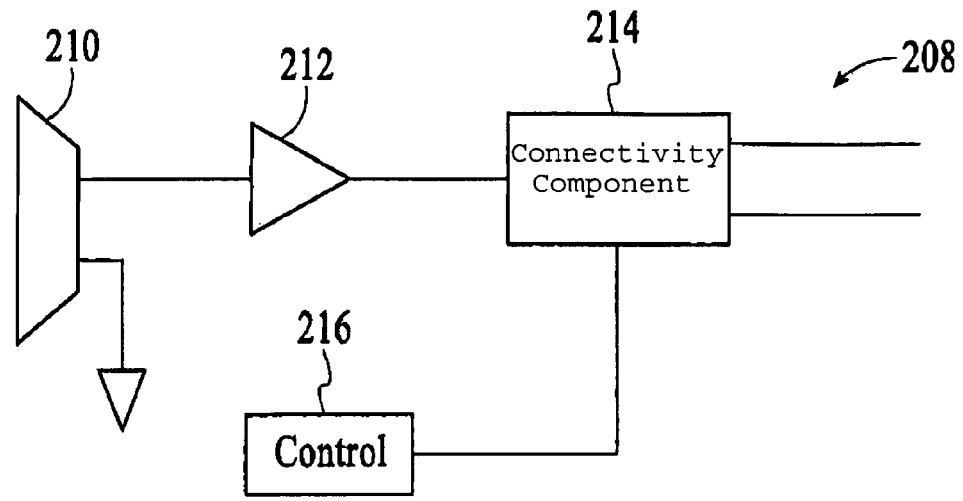
FIGS. 2A-2B are diagrams of exemplary sensor/processing components, consistent with certain aspects related to the innovations herein.

Reference will now be made in detail to the invention, examples of which are illustrated in the accompanying drawings. The implementations set forth in the following description do not represent all implementations consistent with the claimed invention. Instead, they are merely examples consistent with certain aspects related to the invention. Wherever possible, the same reference numbers will be used throughout the drawings to refer to the same or like parts.

As set forth in the drawings, a representative gunshot detection system 100 is shown in one exemplary environment in FIG. 1. In such exemplary implementations, a plurality of sensors 102-106 may be dispersed over a monitored area. For example, each sensor may be placed such that it has a relatively unobstructed acoustic view around its immediate area. By way of example and not limitation, some suitable sites (e.g., for more stationary sensors) may include: placed atop a building; placed atop utility or light poles; on towers, etc. Sensors may also be mounted on vehicles, or on individual persons such as soldiers to enable monitoring around these vehicles or persons. Typically sensors 102-106 communicate through a communications network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital information, and that network 108 may comprise any combination of known networks and/or sub-networks, such as, by way of example and not limitation: wired or wireless networks, telephony-based networks; the internet; public and/or private computer networks, dedicated wires routed to the sensor array, etc., among many others.

As will be appreciated by those skilled in the art, information regarding detected acoustic events may be transmitted to processing components of interest such as those associated with police dispatch, military personnel, etc., and/or directly to appropriate individuals, as through network 118 to display devices 120 or a computer console. When exemplary weapon 122 is fired, the various impulses described below reach sensors 102-106 at different times based on the distance of each sensor from the shooter and other facts such as the speed of sound. Whether the acoustic information is processed at the sensor, or at computer 110, pulse information may be determined for each sensor and the differences between the various information are processed to determine a location of the source of the gunshot. In response to the gunshot, information may be provided at component 120.

Several exemplary sensors, described here for purpose of illustration not limitation, may be utilized consistent with the innovations herein. Turning to FIG. 2A, for example, a wired sensor 208 may includes one or more microphones 210, one or more signal processing components 212, a connectivity component 214, e.g., to interface to/with a communication network 214, and a control component 216 that may handle various processing features such as administrative functionality. Optionally, sensor 208 may include other functionality such as, by way of example and not limitation temperature sensing, gain control, connectivity monitoring, etc. In such exemplary systems employing at least one wired sensor 208, audio information may be transmitted via communication network 215 to a central location where the audio information is digitized and processed regarding gunshot detection, determination of source location, etc.

Figure 2B:
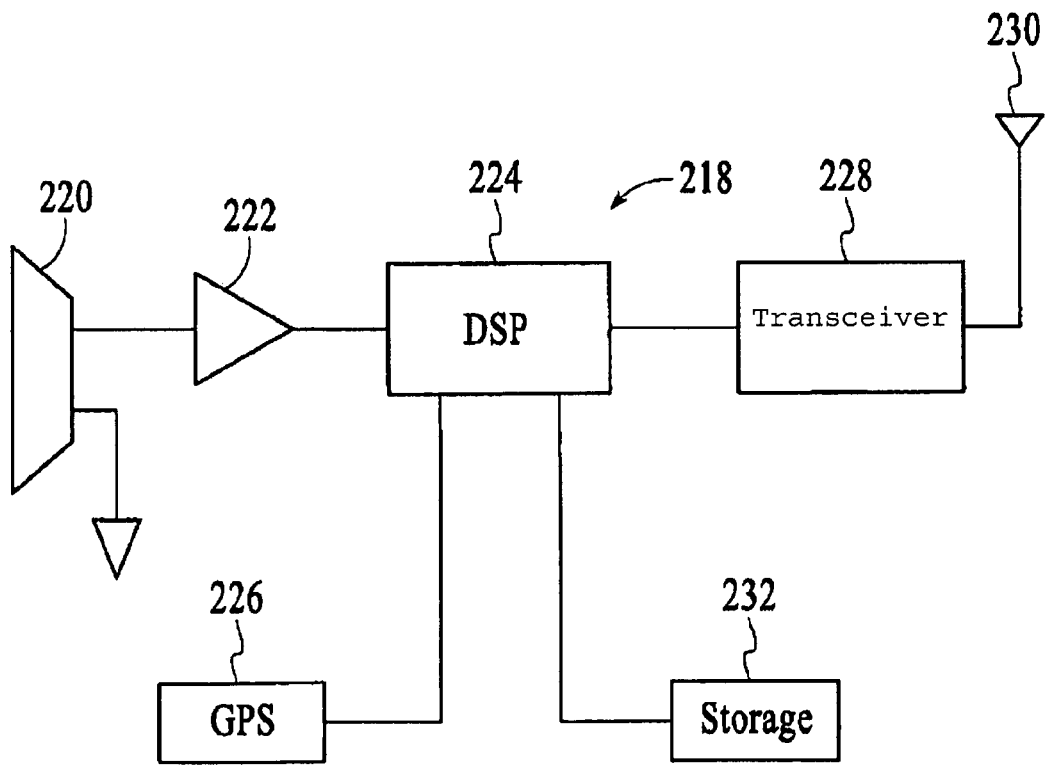

With reference to FIG. 2B, an exemplary implementation of a wireless sensor 218 includes one or more microphones 220 for receiving acoustic information, one or more signal processing components 222; a processor 224, typically a digital signal processor ("DSP"), as are well known in the art, optionally, a satellite positioning receiver, e.g. a GPS 226; a RF or other transceiver 228 configured for wireless transmission and reception of signals; and antenna 230. In some exemplary implementations, DSP 224 may process the received audio information to detect various gunshot impulses/features and determine characteristics associated with the gunshot. Sensor 208 may also include a mass storage device 232 for archival of audio data. For purposes of this invention a "mass storage device" is a device for storage of digital information. By way of example and not limitation mass storage devices include: magnetic disk drives; optical disk drives; CD-ROM drives; DVD drives; flash storage devices such as memory sticks, CF cards, SD cards, MMX cards, and the like; floppy disk drives; as well as any other file oriented type storage device.

Figure 3A:
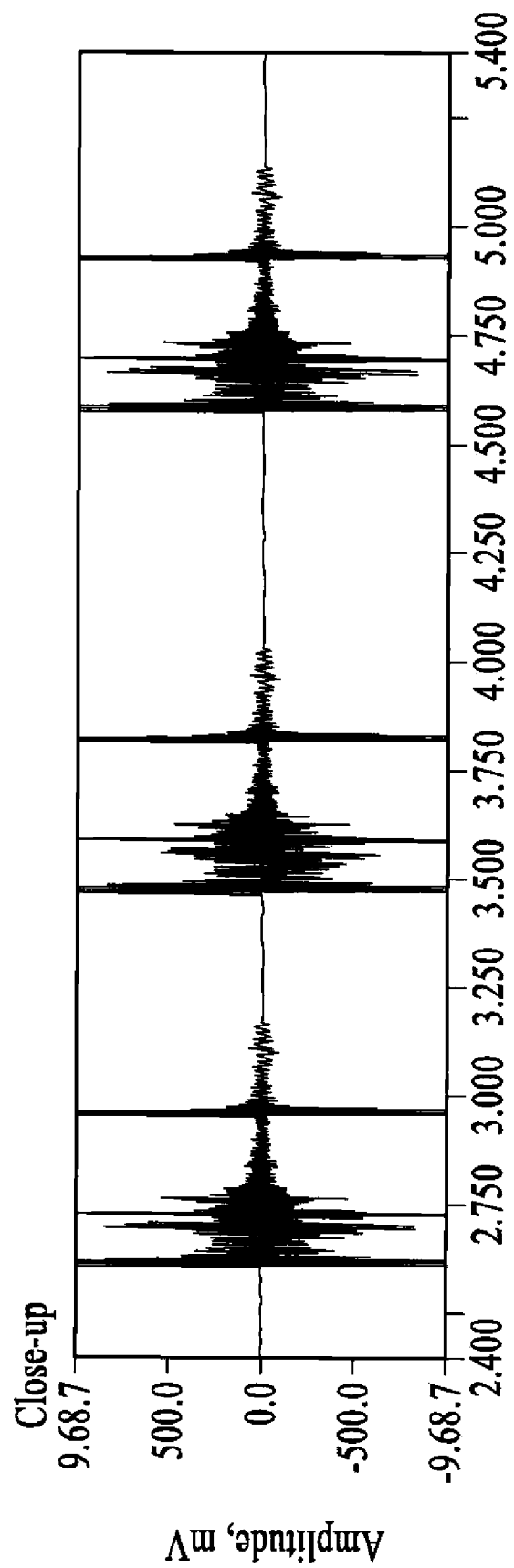
FIGS. 3A-3C are diagrams illustrating exemplary waveforms, consistent with certain aspects related to the innovations herein.
Figure 3B:
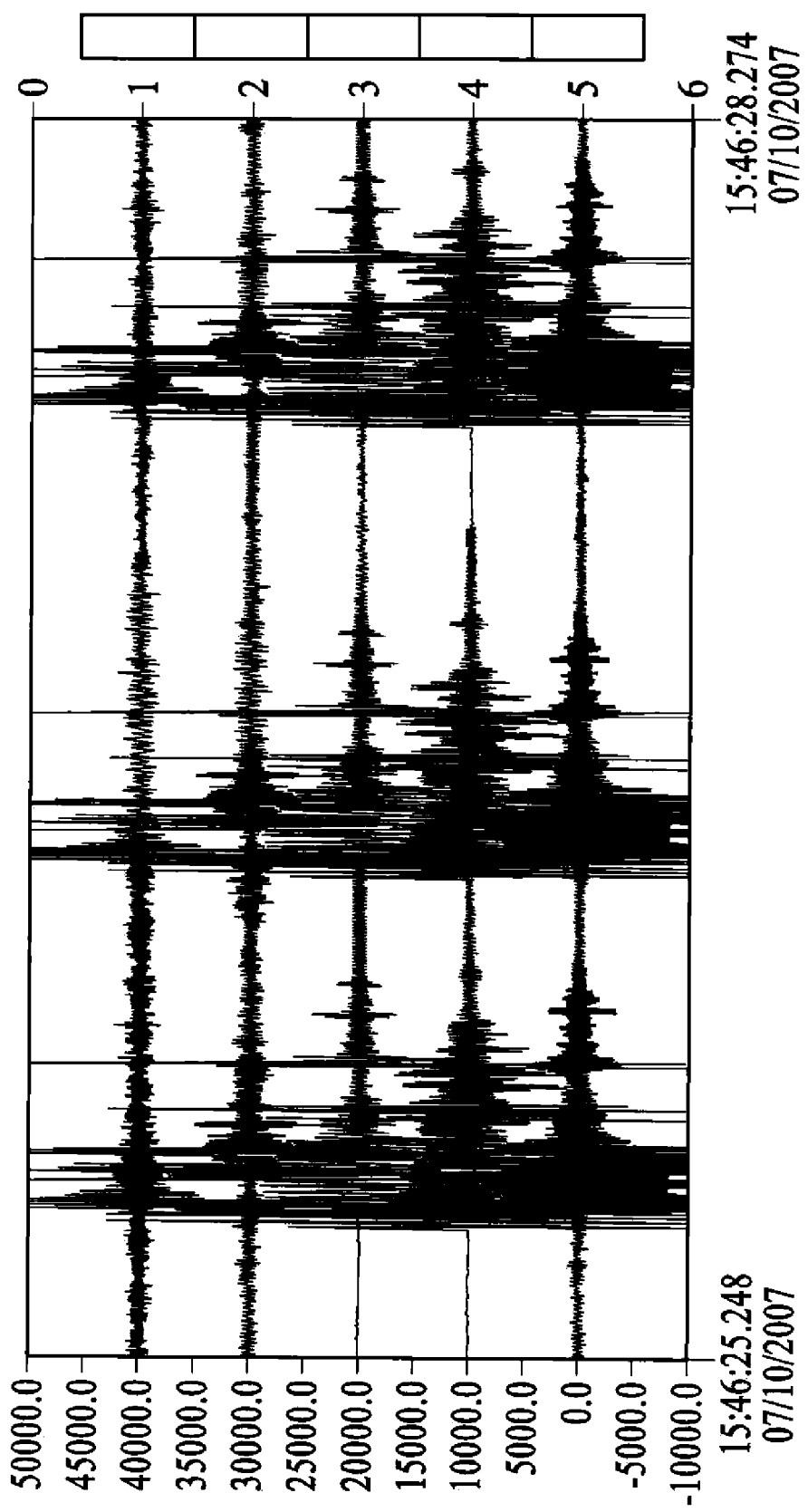
Figure 3C:
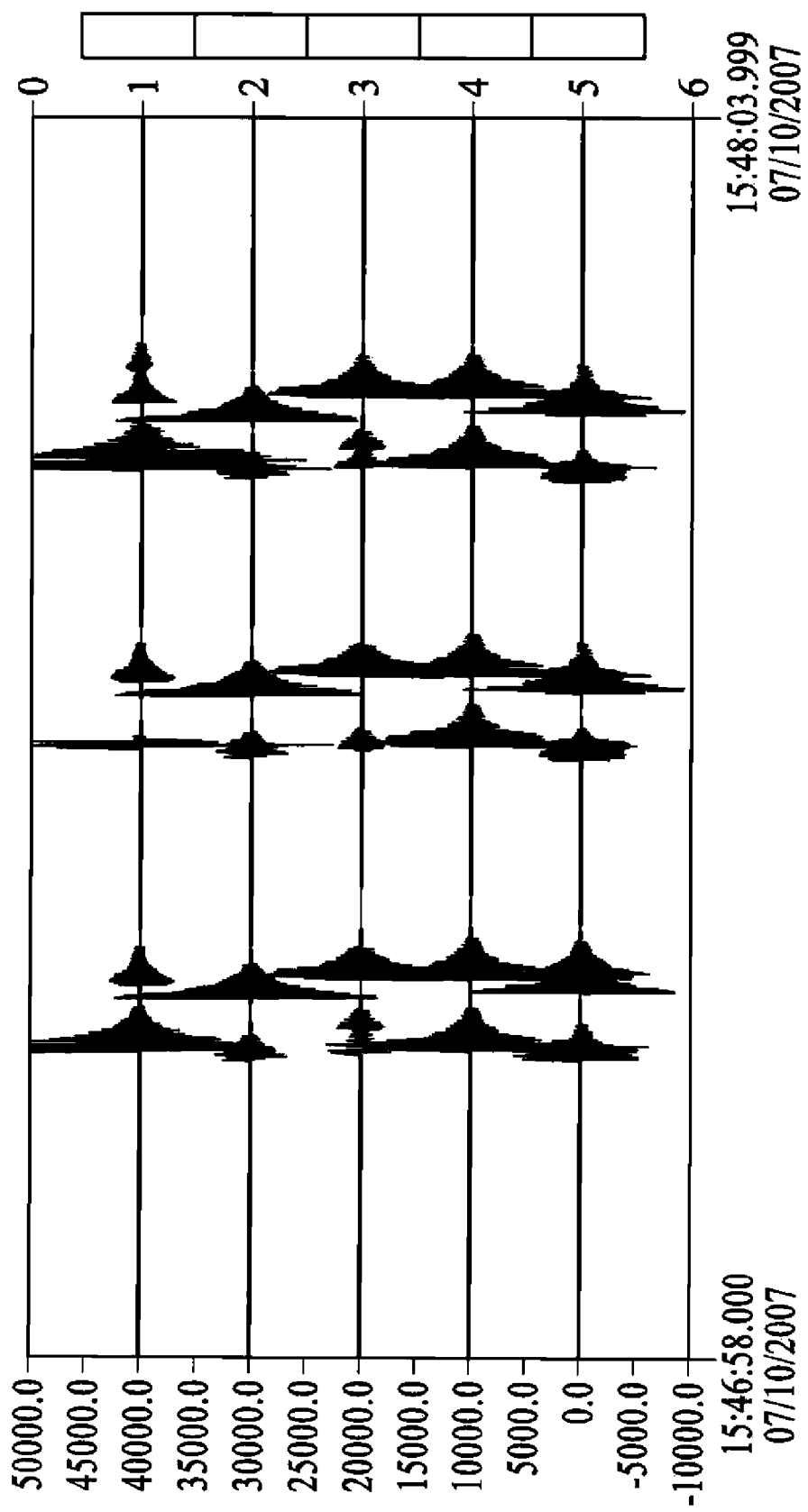

With existing gunshot detection systems, it is often not possible to provide reliable information regarding the gunshot, shooter, source location, etc. with a single sensor (see, e.g., FIG. 3A). As a result, accurate calculation of such information requires computation based on the outputs of a plurality of sensors. FIG. 3B, for example, illustrates exemplary acoustic waveforms from 5 sensors. FIG. 3C, in turn, illustrates exemplary unaligned time domain representations of these acoustic waveforms showing actual arrival times of bullet pulses and muzzle pulses on each of the 5 sensors. Consistent with aspects of the innovations set forth below, such acoustic waveforms from a plurality of gunshots and sensors may be processed vis-à-vis alignment therebetween to determine the specific identities of corresponding pulses for purposes, e.g., of precisely calculating desired information regarding the gunshot, shooter, source, etc.

According to aspects of the innovations herein, such audio waveforms or streams may be fully processed by remote sensors, by independent processing unit(s), and/or by other disparate/distributed processing components. Further, by means, e.g., of such remote or other disparate/distributed processing, the audio streams may be reduced to a set of discrete pulses, each of which may be characterized by one or more pulse parameters. Exemplary pulse parameters may include arrival time, amplitude(s), rise time or other characteristics relating to slope, a time-based feature of the pulse, among other known parameters, as well as, in the case of multiple microphone sensors, characteristics relating to angle of arrival. In some implementations, only this discrete representation of each pulse (typically 100 bytes or less per pulse, compared with 88,200 bytes per second of audio) is transmitted back to the subsequent processing component for further analysis.

Consistent with such processing components, including, for example, processors located at a central processing station but not limited thereto, the pulses from all sensors may be stored or held in a queue until the shooter has finishing firing, a timeout occurs, or the system otherwise initiates subsequent processing. Next, in one exemplary implementation, the pulses from each sensor are split into two sets, a set of likely bullet pulses and a set of likely muzzle pulses. The pulses may be divided into these or other subsets for comparison/matching by a variety of techniques. For example, the pulses may be subdivided on the basis of various pulse characteristics known or measured, e.g., by the signal processing components. Here, one advantageous pulse characteristic is the median power frequency, i.e., the frequency f at which half the power of the sample is between 0 and f Hz. Here, one advantageous pulse characteristic is the median power frequency, i.e., the frequency f at which half the power of the sample is between 0 and f Hz. As will be appreciated by those skilled in the art, other scalar measurements in the frequency domain could be used to characterize the signal, such as the bandwidth of the power spectrum, the fraction of power below a certain frequency. Other advantageous pulse characteristics include the pulse envelope, the angle of arrival, slope, rise time, and/or other time-based characteristics.

Figure 4A:
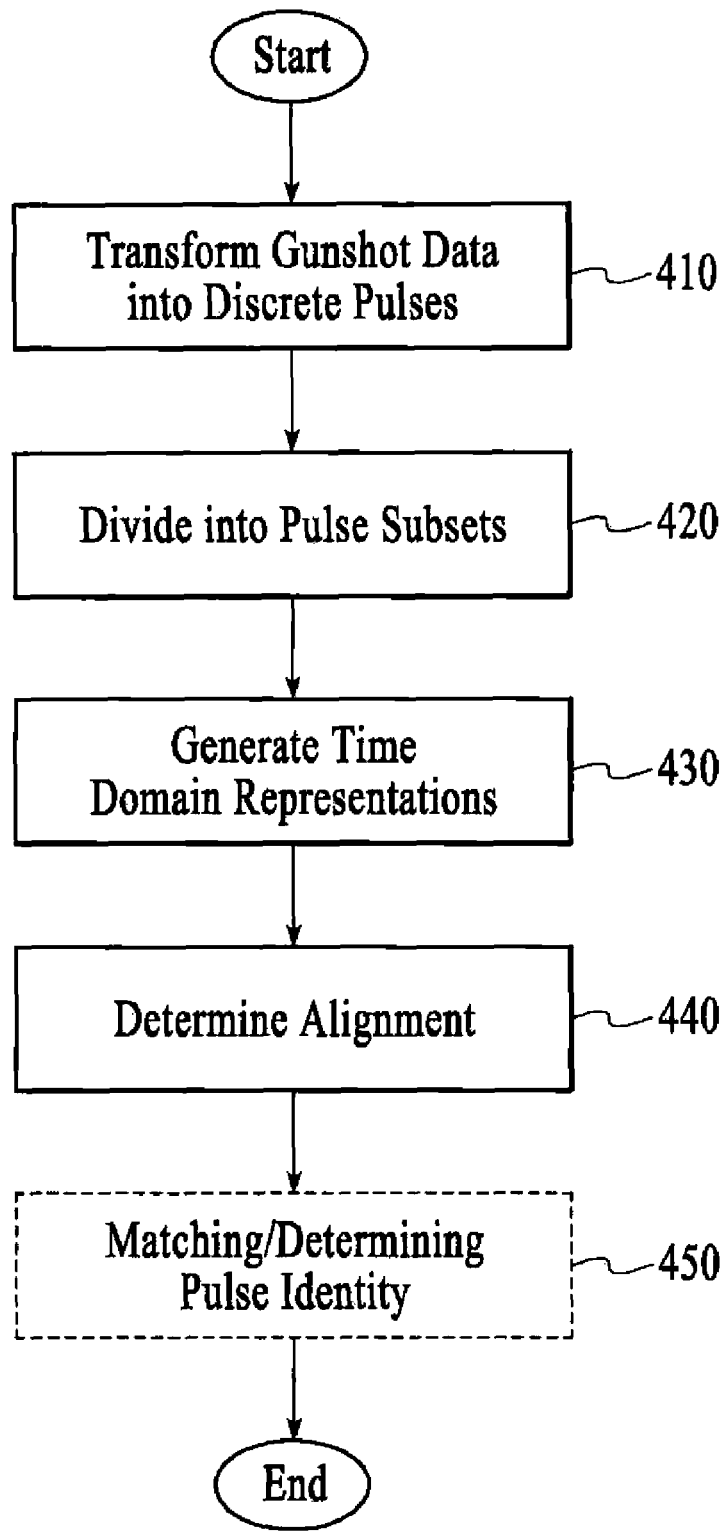
FIGS. 4A-4D are flow diagrams illustrating various exemplary signal processing functionalities, consistent with certain aspects related to the innovations herein.

One exemplary utilization of such subsets in an overall process is shown in the illustrative implementation of FIG. 4A. Referring to FIG. 4A, one exemplary method 400 may include transforming initial gunshot data associated with one or more sensors into a set of discrete pulses 410, dividing the discrete pulses into pulse subsets 420, generating, for the subsets, time domain representations of the pulses 430, wherein the time domain representations include waveforms having pulse features, and processing the time domain representations to determine alignment between one or more of pulse features, pulses, pairs of channels, and/or pairs of sensors 440. One or more further implementations may also include determining the identity between pulses/gunshots in association with a matching process performed as a function of the alignment 450. Of course, some embodiments of the herein may not include all of the specific processing steps set forth in the flowcharts of FIGS. 4A-4D, as systems or methods consistent with the innovations herein may receive signals upon which portions of the processing have been performed. Similarly, certain steps may readily be distributed in ways to better facilitate signal processing, such that implementations that omit steps such as these may still be within the ambit of the invention.

Turning to the process of generating time domain representations of the pulses 430, as seen, e.g., in FIG. 4A, implementations consistent with the innovations herein may include processes such as generating synthetic time domain representations and/or utilizing cross-correlation to determine alignment between the pulse representations, among others. Indeed, since complex acoustic waveforms cross-correlate poorly, the synthetic time domain waveforms set forth herein are particularly advantageous in such cross-correlation processing. Further, consistent with the innovations herein, the bullet pulses and muzzle pulses for each sensor may be used independently to generate a synthetic time domain representation of the signal received on the sensor. For example, the synthetic time domain representation can be created at a lower sampling rate (such as 512 samples per second) than the original waveform and still yield acceptable resolution in timing offset, and each pulse can be given an artificial width in the time domain to help obtain matches under real-world conditions such as moving shooter or sensors or imperfect measurement of sensor locations with GPS devices.

Figure 4B:
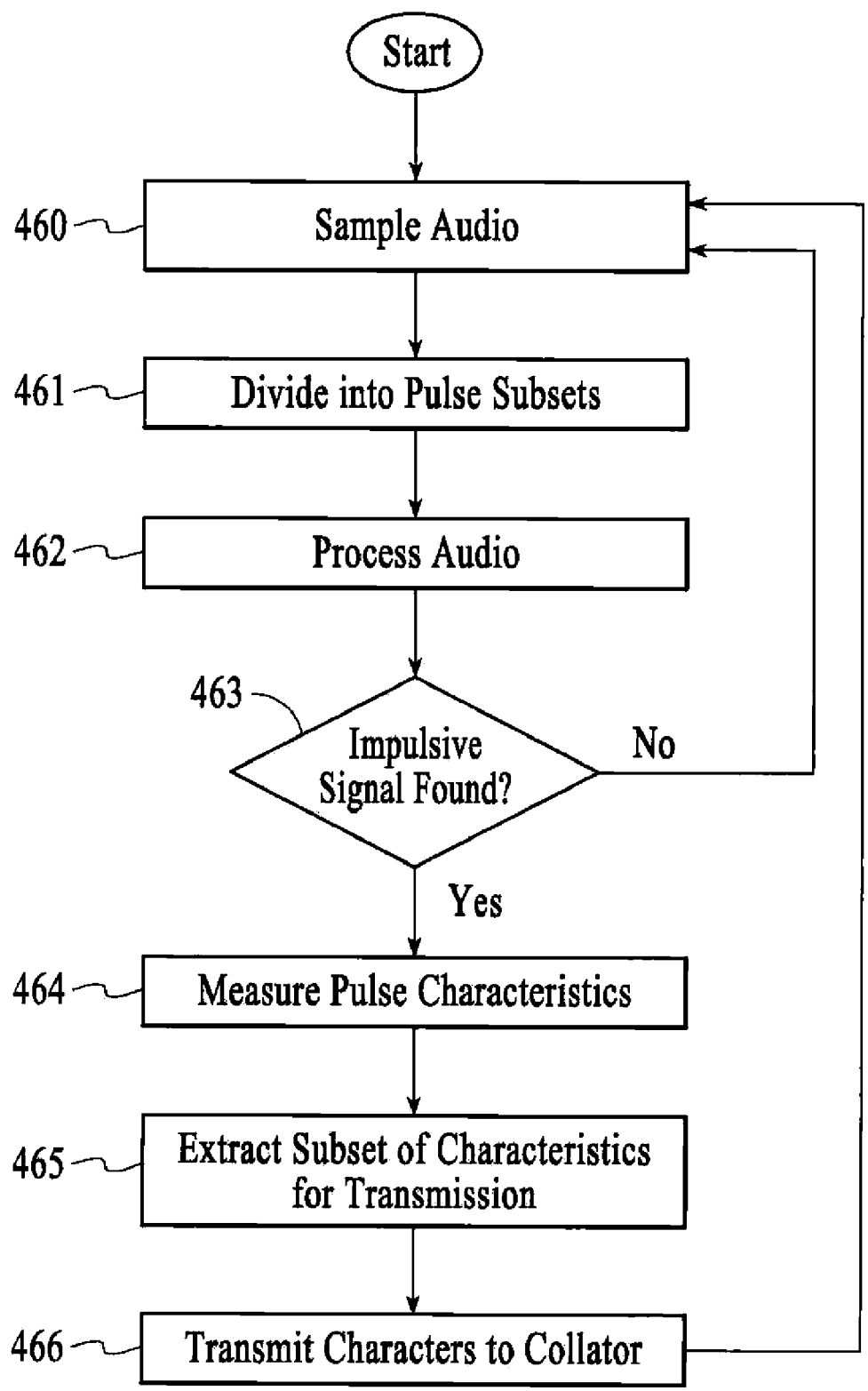

FIG. 4B is an exemplary diagram illustrating processing of the audio that is performed on a sensor or other device capable of processing an audio stream. According to aspects of the innovations herein, on startup, an initialization process (460) may define buffers and memory required for processing. Audio samples may then be continuously acquired (461) at a constant sampling rate, such as 44 kHz, and placed in a buffer. The buffer may be periodically processed to find impulsive signals (462), impulsive signals being those in which the amplitude increases from a low value to high value in a short interval of time. Should an impulsive signal be found (463), the audio is processed from the point at which the signal starts to change from low amplitude to high amplitude and extending 1 millisecond to 500 milliseconds beyond that point so as to characterize the pulse. The measurements made during this characterization process (464) include but are not limited to: the peak amplitude of the signal; the time required to reach the peak signal level; the background noise level before the pulse starts; the power spectrum of the signal; and the time-domain envelope of the signal. In order to reduce the communications bandwidth required, a subset of these pulse characteristics comprising those required for later processing steps are extracted from all pulse characteristics (465). Finally, in this illustrative example, the subset of pulse characteristics are transmitted (466) to a central processor or collator that processes pulses received by all sensors able to detect audio from this gunshot incident.

Figure 4C:
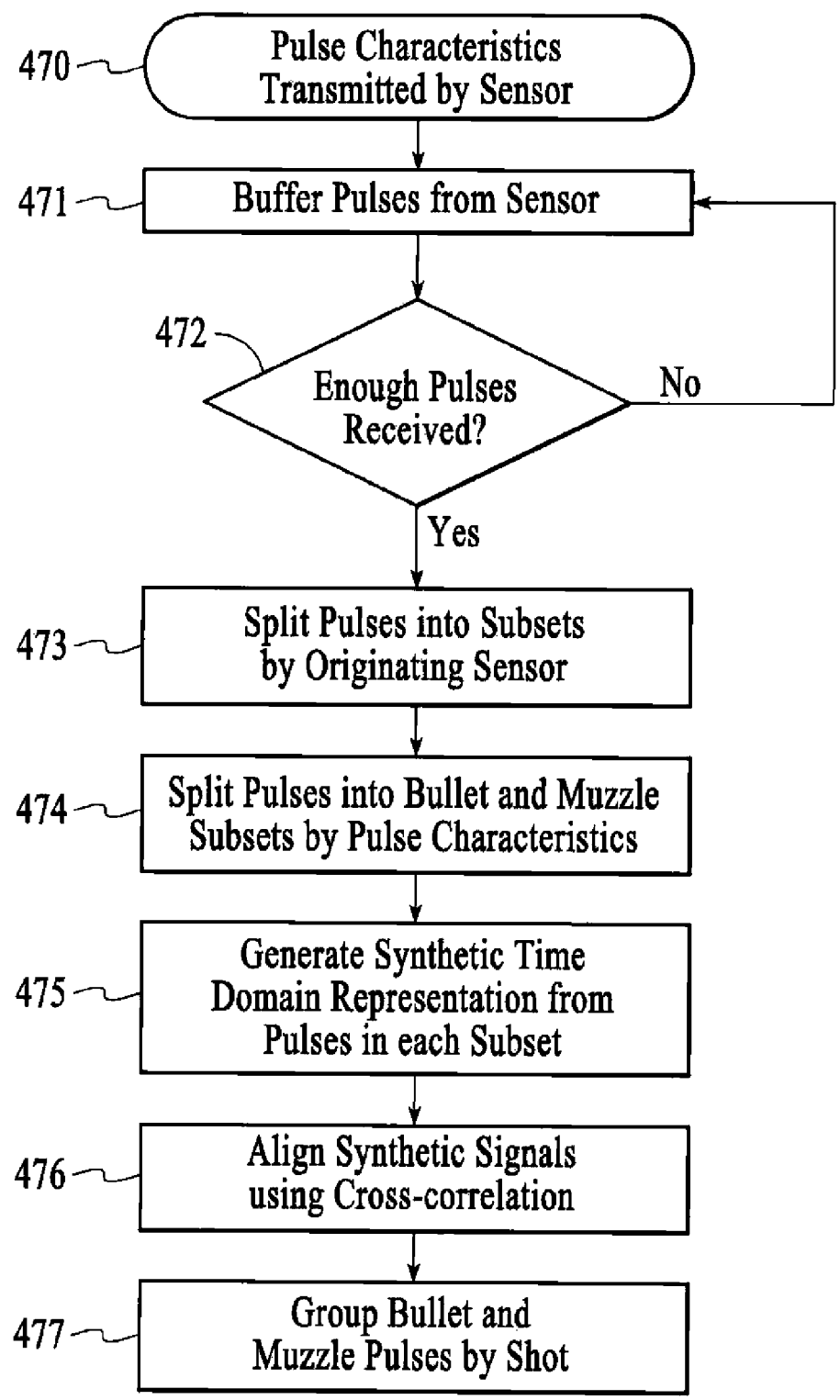

FIG. 4C is an exemplary diagram illustrating processing of pulse data received from one or more sensors detecting gunshot audio (470). An exemplary feature of the processing is to group together all of the bullet and muzzle pulses as detected by one or more sensors from a single discharge event. This may be accomplished by buffering pulses until pulses from at least two and preferably more than two shots have been detected. A test may then be applied at (472) to determine whether a sufficient number of pulses has been received to commence processing. Exemplary tests, here, may include: wait twice as long as the typical spacing between shots, and if no more pulses are detected in this time, or if more than a certain number of seconds has elapsed, such as five seconds, continue to a subsequent processing step. In such a subsequent processing step (473), pulses may first be split into subsets by the originating sensor. Next, according to some of the innovations herein, each of those subsets may be further split into subsets (474) likely to have been generated by noise created by the propagation of a supersonic round (bullet shock wave), and those likely to have been generated by the noise of the discharge of the weapon (muzzle blast). Note that the empty set can be an allowable subset; i.e., aspects of the innovations herein may applicable to sensors on which no bullet sounds are detectable. After such exemplary processing, no subset contains pulses from more than one sensor, and each subset contains only pulses likely to have originated from the muzzle blast, or pulses likely to have originated from the bullet shock wave, or no pulses. Continuing with this exemplary implementation, in processing step (475), a synthetic time domain representation is generated from the pulses in each subset. One exemplary generation of a synthetic time domain representation is further illustrated in FIG. 4C. Once synthetic time domain signals have been generated for all signals, one signal is selected as the master pattern and the timing offset between the master signal and each remaining synthetic signal is determined by computing the cross-correlation of the signals pair-wise and finding the location of the peak in the output of the cross-correlation function (476). According to such exemplary implementations, the master signal is that signal which, when used as the master signal, results in the highest overall sum of the peak value of the cross-correlation between that master pattern and each other pattern. Finally, the offsets determined by cross-correlation are applied to the synthetic time domain signal, and pulses are assigned to each shot (477), as follows: each pulse found in the master signal is assumed to be a unique shot, and each pulse found at that time (after adjusting for the offset) on other channels is assumed to also result from that shot. In this manner, all of the bullet and muzzle pulses associated with shot 1 are grouped together into one subset, all of the bullet and muzzle pulses associated with shot 2 are grouped together into one subset, and so forth. Some pulses may not be associated with any shot after this process.

Figure 4D:
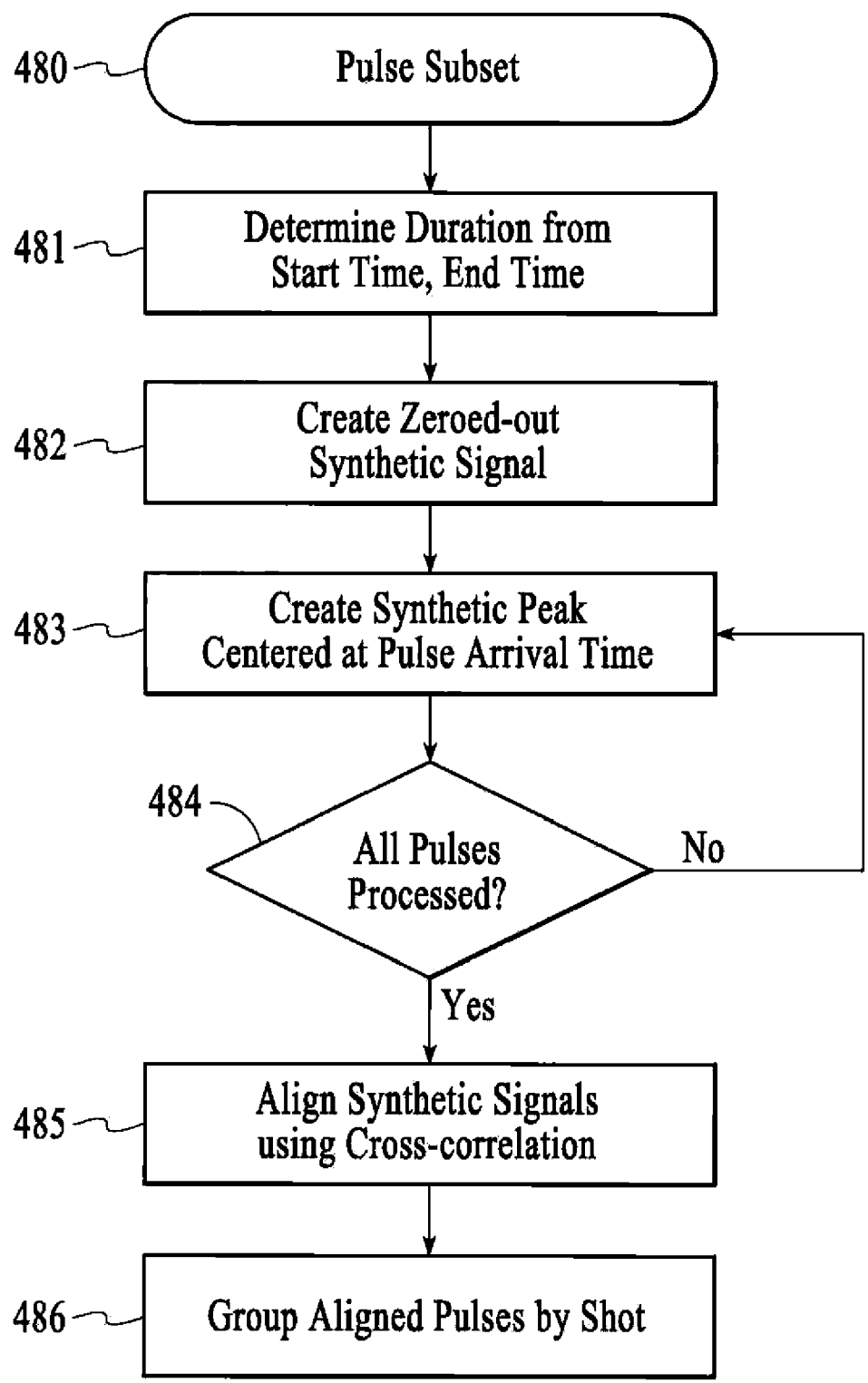

FIG. 4D is a diagram that illustrates one exemplary manner of generating a synthetic time-domain representation of a set of pulses. A set of bullet or muzzle pulses on a single sensor, comprising a subset of all bullet and muzzle pulses on all sensors, is collected for analysis (480). The duration of the time domain signal may be computed from the difference between the last and first pulse arrival times (481). A buffer of this duration plus a small amount of additional time at each end is created and filled with zeros. To improve processing performance, the buffer can be at a sampling rate significantly below that of the original time domain data, such as 512 samples per second. It may also be advantageous to pad the buffer lengths to the nearest power of 2, as cross-correlations can be efficiently computed using fast Fourier transforms. Further, a second identically-sized buffer may be used to label each sample with the pulse to which it belongs, if any. Such a second buffer may initially be filled with invalid references.

Such an exemplary synthetic time domain representation may then be built up by inserting a Gaussian curve or other function of the pulse's characteristics that is centered on the arrival time of the pulse. An exemplary construction is to define the amplitude of each Gaussian to be a function (such as linear, square root or logarithm) of the original pulse amplitude. The associated samples in the labeling buffer are filled with references or pointers to the original pulse. Consistent with aspects of the innovations herein, cross-correlation of the synthetic signals (485) may determine the relative offset of pairs of channels or sensors; application of this offset to the labeling buffer allows the pulses that comprise each shot to be read out of the labeling buffers (486) by collecting all valid pointers at particular offsets.

Further, such process(es) may, most preferably, be conducted by sorting the pulse subset in reverse chronological order so that earlier pulses overwrite later pulses. This favors earlier pulses and acts to suppress echoes. In another advantageous implementation, the pulses are clustered by time and a weighting factor included for each group of pulses that favors the earlier pulses in each cluster. This also has the advantage of suppressing echoes.

An exemplary generic process of creating a synthetic time domain representation may include: determining, from a set of bullet pulses and muzzle pulses from a plurality of sensors, a value (length) of a minimum time window for the synthetic time domain representations; generating a waveform as a function of a selected sampling rate and the determined value (length); dividing pulses into first subsets, wherein the first subsets are differentiated by each being associated with a sensor; dividing pulses associated with each sensor into second subsets, wherein the second subsets are differentiated via bullet pulse or muzzle pulse characteristic; for pulses associated with a sensor, determining an offset into the synthetic time domain, and re-characterizing, in creation of the synthetic time domain representation, portions of the waveform at the offset or in a range around the offset.

For example, one exemplary specific synthetic time domain representation may be achieved by:
1. Taking a set of bullet pulses and muzzle pulses from all sensors
2. Determining the minimum time window for the synthetic time domain representations by subtracting the earliest arriving pulse from the latest arriving pulse and adding a small additional margin at either side.
3. Generating a zero-valued waveform of the selected sampling rate (such as 512 Hz) and the length determined by step 2.
4. Dividing pulses into subsets by sensor.
5. Dividing pulses on each sensor into subsets by bullet pulse or muzzle pulse.
6 For each bullet or muzzle pulse on a sensor, determining the offset into the synthetic waveform from the arrival time of the pulse, the starting time of the synthetic waveform and the sampling rate of the synthetic waveform. Replace the zeros in the waveform with non-zero values at that offset less the half-width of the match window through the offset plus the half-width of the match window.
7. If there are no bullet pulses or no muzzle pulses on a sensor, the appropriate synthetic time domain waveform is not generated. However, because bullet and muzzle pulses are treated independently, the algorithm will work even when much of the data are missing; for example, it will correctly align sets of all bullet pulses or of all muzzle pulses.

In some exemplary implementations, the function used to generate the synthetic waveform may be a Gaussian ($y=e^{-((x-mu)/sigma^2)}$) with mean mu equal to the arrival time of the pulse and standard deviation sigma equal to the half-width of the match window. Further, while other functions (such as a binary 0 or 1 function) may be used, Gaussians have many nice properties such as symmetry about the mean and maximum value at the mean that make them ideal for this application. The peak amplitude of the function can be any pulse feature that is desirable for matching; in some advantageous implementations, the square root of the amplitude was found to be a good balance between emphasizing nearby sensors over distant sensors without allowing the nearest sensor to overwhelm the rest.

In further exemplary implementations, after generation of the synthetic time domain representations, the standard mathematical technique of cross-correlation may be used to determine the optimal alignment between pairs of channels or sensors. Comparison of an arbitrary number of channels or sensors can be performed by comparing each channel in turn with a reference channel. In order to select the best reference channel, each channel can be considered as the reference channel in turn. Although the number of cross-correlations in the preferred embodiment is significant (as many as $n^{\wedge}2$ are used), each cross-correlation is very fast due to the great reduction in sampling rate (from 44 kHz to 512 Hz) allowed by the use of synthetic time domain representations of the audio waveform.

Once the optimal offsets have been determined, the identity of each pulse matched by the cross-correlation can be readily determined by applying that offset to a parallel data structure of the same size as the synthetic time domain waveform that tracks which pulse (if any) was responsible for each sample in the waveform.

Since each sample can belong to at most one pulse, echoes are diminished by building the synthetic time domain waveform in reverse-time order so that the earliest pulses overwrite later pulses. In other implementations of the innovations herein, echoes are further diminished by applying a clustering algorithm to the arrival times of bullet or muzzle pulses on a sensor, with a clustering length parameter that is less than the spacing between shots, preferably around 1/e* the spacing between shots, and the pulses within each cluster sorted by arrival time and additionally weighted by a diminishing factor with increasing arrival time.

Figure 5:
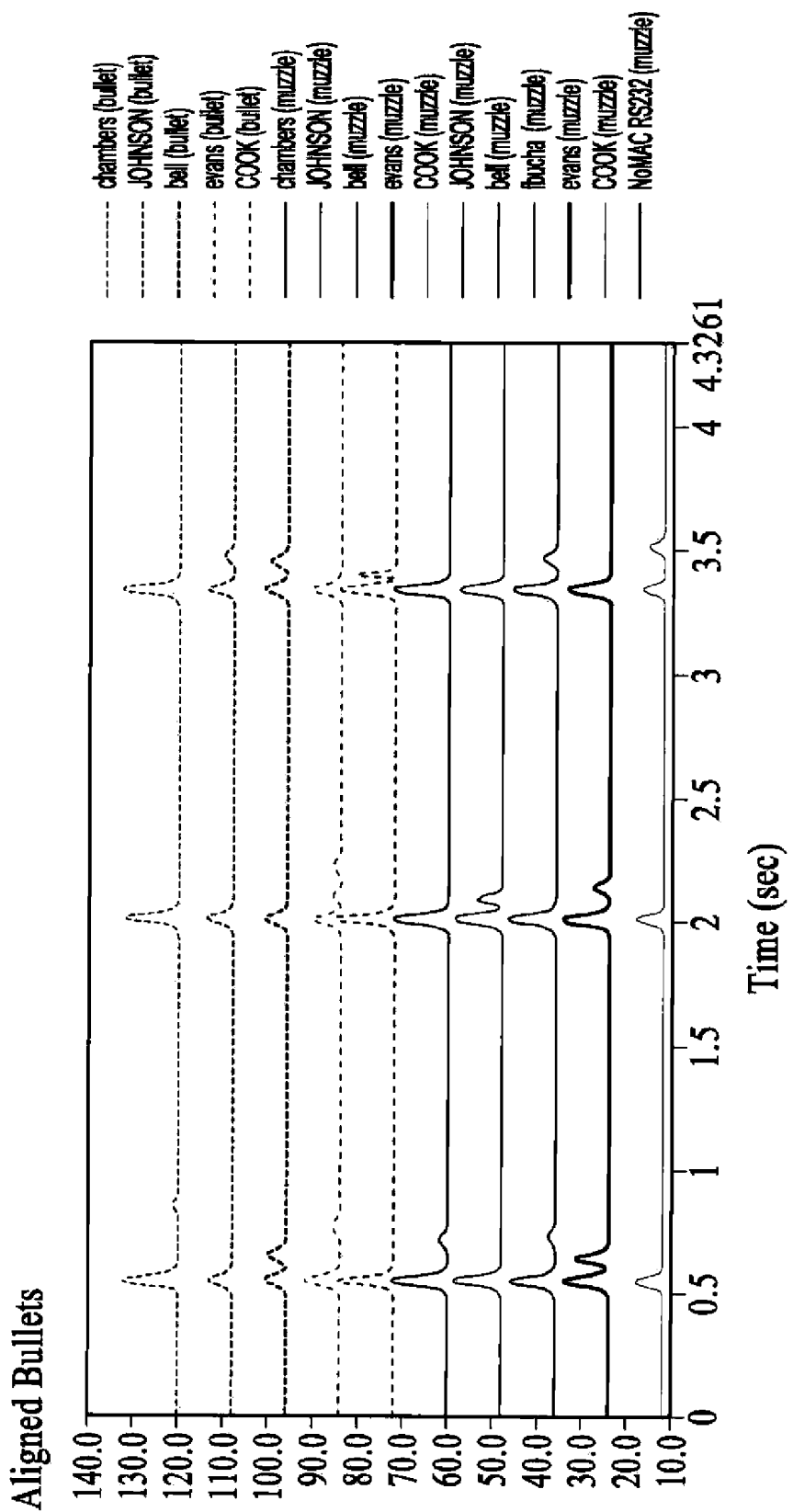
FIG. 5 is a diagram illustrating exemplary post-alignment synthetic time domain representations of bullet pulses (top graphs) and muzzle pulses (bottom graphs) from five sensors, consistent with certain aspects related to the innovations herein.

Indeed, turning to FIG. 5, excellent alignment of pulses for each of three shots is obtained by converting bullet and muzzle pulses into separate synthetic time domain representations and finding the maximum in the cross-correlation.

With regard to generating synthetic time domain representations, one exemplary method may weigh each synthetic arrival time according to a function of the pulse amplitude, such as weight proportional the amplitude, proportional to the log of the amplitude or proportional to the square root of the amplitude. Other exemplary methods may de-emphasizes pulses caused by echoes and reverberation by: (a) performing cluster analysis in the time domain using a clustering parameter that is smaller than the time between shots to obtain the pulses generated by each shot, (b) sorting the pulses in each cluster in order of increasing time to obtain the relative ordering of pulses in each cluster, and/or (c) applying decreasing weights, such as $\{1, \frac{1}{2}, \frac{1}{3}, \frac{1}{4} \ldots\}$ to each pulse in turn so that later pulses in each cluster are de-emphasized over earlier pulses. Still another method may de-emphasizes pulses caused by echoes and reverberation by generating the signal in reverse-time order, so that earlier pulse representations overwrite later ones.

Further, an advantageous exemplary method for aligning two or more bullet pulses and/or two or more muzzle pulses on multiple channels or sensors by computing the cross-correlation of a synthetic time domain representation of the bullet or muzzle pulses on one sensor with a reference synthetic time domain representation constructed from bullet or muzzle pulses on another channel or sensor. Moreover, one of the synthetic time domain signals may be stretched or shrunk in the time domain in order to account for the effects of a moving shooter, moving sensor, or moving aim point.

Additionally, exemplary methods for collecting the bullet and/or muzzle pulses associated with each shot may include generating a look-up table of pointers to pulse records, or null pointers when no record crisis, that parallels the structure of the synthetic time domain representations and locating pulses associated with each pulse on the reference channel by adding the per-channel offsets determined from the maximum value of the cross-correlation of the synthetic time domain representation to the offsets of each pulse in the reference channel and returning all records for which the pulse pointer is valid. Further, exemplary processing may include scoring the number of matches that is based on the number of pulses and channels so that pulses that arc weakly or poorly matched arc discarded. A further exemplary method for validating the associated pulses on each shot may include computing a trial location from those pulses and checking that the self-consistent error (e.g., predicted differences in time of arrival vs. measured differences in time of arrival, etc.) is less or equal to a certain threshold, and if a self-consistent solution is not obtained with all sensors, sequentially discarding channels one at a time until a self-consistent solution is obtained or the number of sensors has fallen below the minimum number required for a match, in which case the pulses may be discarded.

Figure 6:
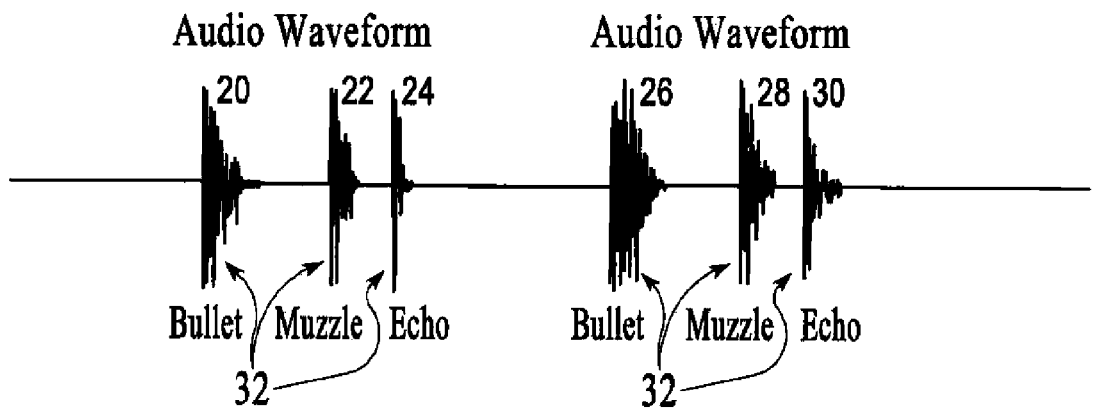
FIGS. 6-13 are a series of one or more exemplary signal processing sequence(s), as set forth in more detail below, consistent with certain aspects related to the innovations herein.

Further, as shown in FIGS. 6-13, an exemplary method of processing pulses to determine their specific/corresponding identities is illustrated. Each figure and its corresponding subject matter are as follows:

FIG. 6 Audio waveform from a single sensor containing 2 bullet pulses and 4 muzzle pulses, of which pulses "3" and "6" are echoes off of a nearby structure.

Figure 7:
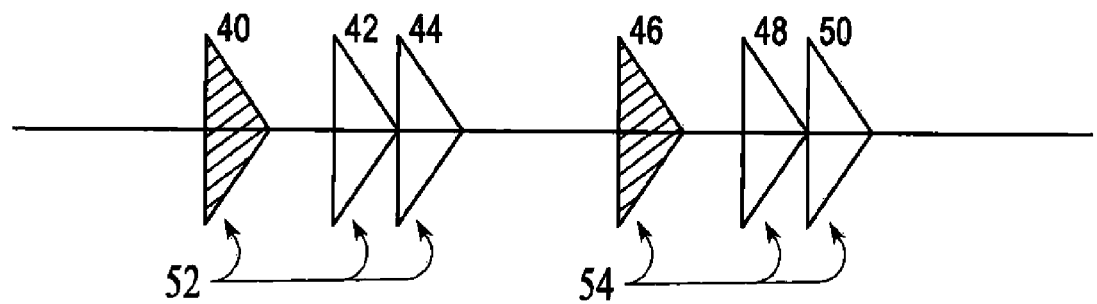

FIG. 7 Signal processing apparatus on sensor searches for impulsive signals, identifies pulses, and builds one discrete data structure for each pulse found which comprises pulse amplitude, envelope characteristics and frequency domain characteristics suitable for classifying the pulse as a bullet or muzzle pulse.

Figure 8:
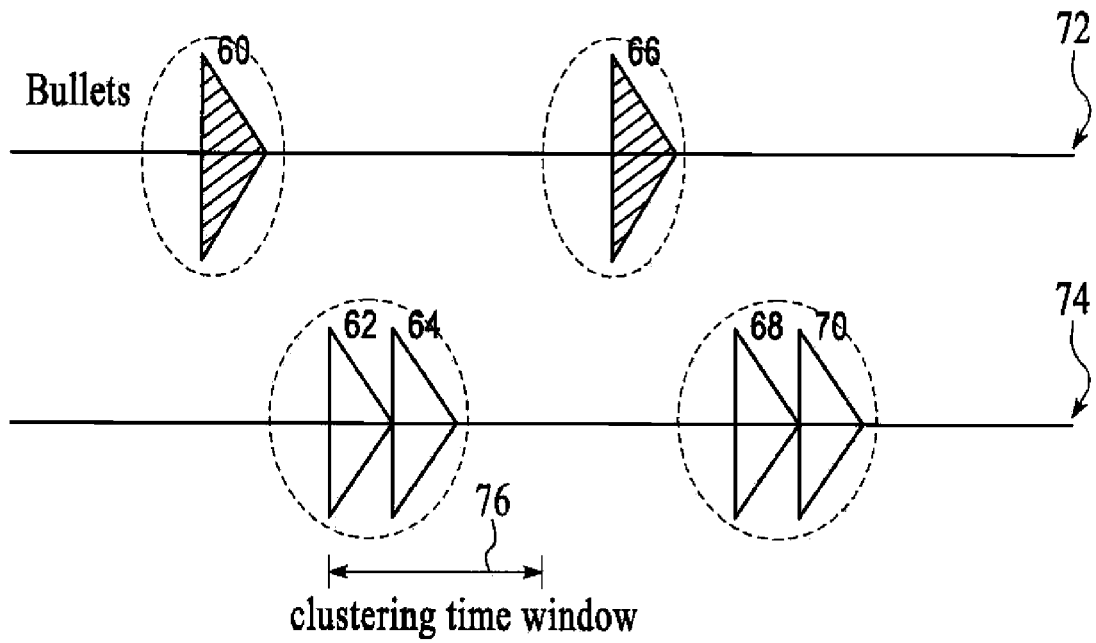

FIG. 8 After transmission to the central processing server, the pulses may be split into subsets of bullet and muzzle pulses. Cluster analysis on arrival time is used to break the pulses into subsets that likely are the result of a single shot.

Figure 9:
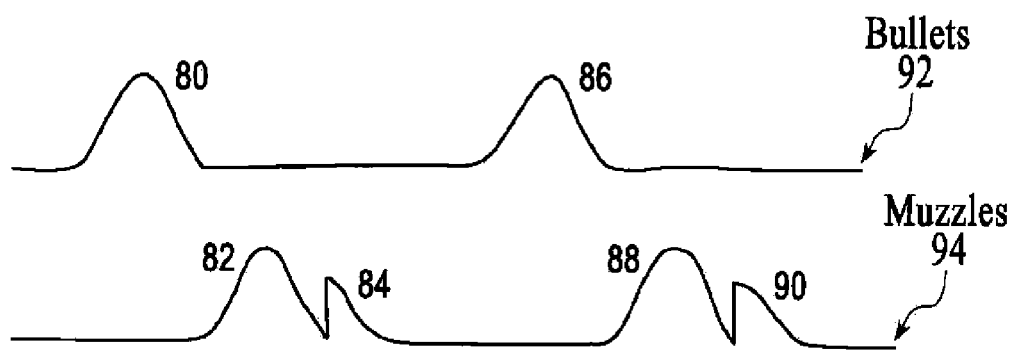

FIG. 9 A weight may be computed for each pulse. In this case, the formula used is sqrt(amplitude*1/(pulse ordering in cluster))

Figure 10:
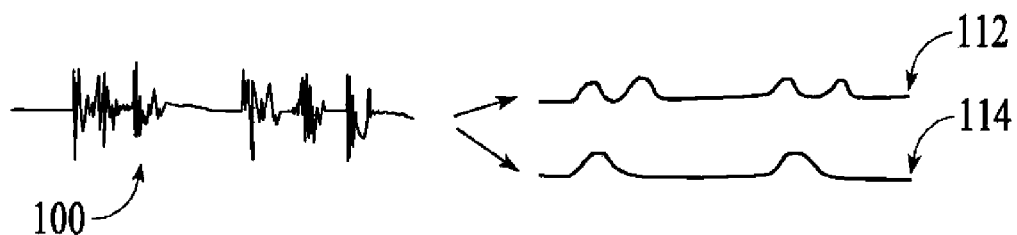

FIG. 10 A synthetic time domain representation of each sensors bullet and muzzle pulses may be constructed using Gaussian probability distributions from the weights and a pre-determined matching tolerance designed to accommodate imperfect data.

Figure 11:
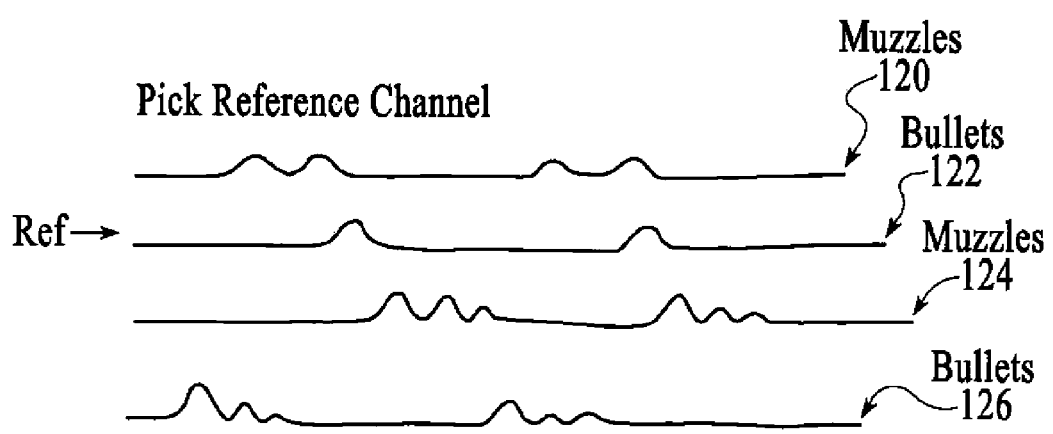

FIG. 11 The same process may be repeated with n other channels.

Figure 12:
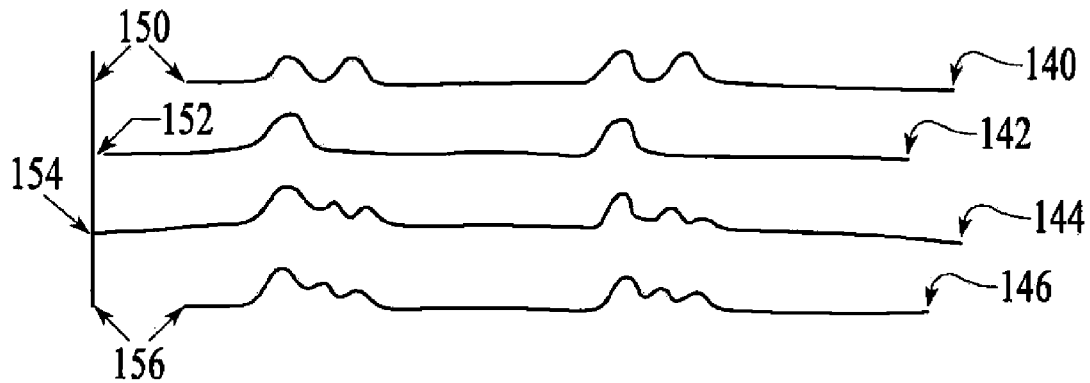

FIG. 12 A reference channel is selected. The ideal reference channel has every real pulse and no echo pulses.

Figure 13:
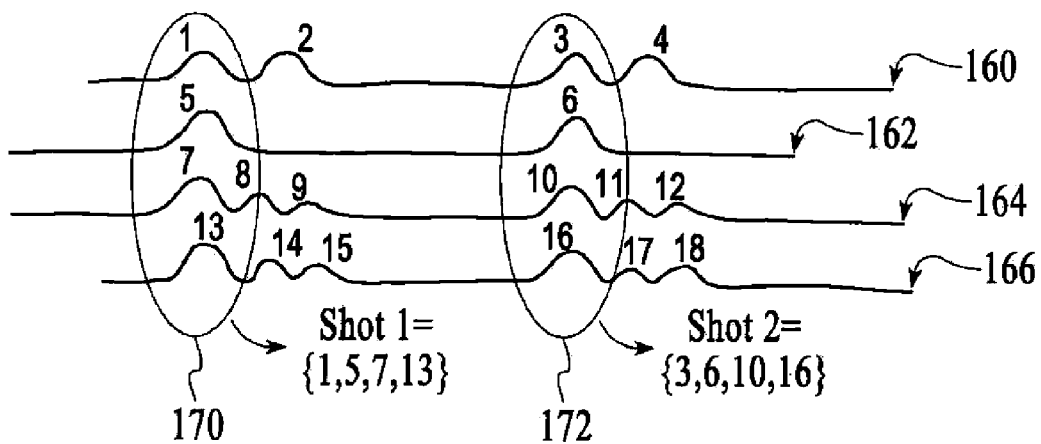

FIG. 13 Cross-correlations are performed in a pair-wise manner and the peak value of each cross-correlation determined. The index of the cross-correlation gives the offset of each channel.

After alignment of the synthetic time domain representations, search for pulse on all channels that are aligned with each pulse in the reference channel. If an inadequate number of matches is found, discard the result. If an adequate number of matches is found, associate the pulses and pass them on to the next stage of the location routines.

As disclosed herein, aspects, embodiments, features and functionality consistent with the present innovations may be implemented via computer-hardware, software and/or firmware. For example, the systems and methods disclosed herein may be embodied in various forms including, for example, a data processing component, such as one associable with a sensor or a computer that also includes a database, digital electronic circuitry, firmware, software, or in combinations of them. Further, while some of the disclosed implementations describe signal processing components such as software, systems and methods consistent with the present invention may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, sensor, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other implementations, embodiments, etc. are within the scope of the following claims.

I claim:

1. A method of processing gunshot information to determine correlation of acoustic impulses with associated gunshots in a gunshot sequence, the method comprising:
transforming, by one or more computer processing components, initial acoustic gunshot signals detected by one or more sensors into a set of discrete pulse data structures characterized by one or more pulse parameters;
dividing the discrete pulses into subsets including a likely bullet pulses subset and a likely muzzle pulses subset, wherein the discrete pulses are divided into subsets as a function of one or more pulse characteristics;
generating, for the subsets, time domain representations of the pulses, wherein the time domain representations include waveforms derived so as to provide a synthesized representation of the acoustic impulses; and
performing a pattern matching process that includes processing the time domain representations to determine alignment between synthesized representations of the acoustic impulses;
determining which acoustic impulses are associated with which shot in the gunshot sequence via the pattern matching process.

2. The method of claim 1 wherein the waveform is derived via a Gaussian function of pulse information.

3. The method of claim 1 wherein the pulse information includes an absolute arrival time of a pulse and a match window range.

4. The method of claim 1 wherein the waveform is derived via a binary 0 or 1 function.

5. The method of claim 1 wherein the processing step comprises a comparison of channels or sensors that includes cross-correlation.

6. The method of claim 1 wherein a pulse's identity is determined by applying the pulse's offset to a data structure corresponding to a waveform that tracks which pulse was responsible for each sample in the waveform.

7. The method of claim 1 wherein the time domain representation is a synthetic time domain representation wherein bullet pulses and muzzle pulses are processed (handled) independently.

8. The method of claim 7 wherein generation of the synthetic time domain representation includes:
determining, from a set of bullet pulses and muzzle pulses from a plurality of sensors, a value (length) of a minimum time window for the synthetic time domain representations;
generating a waveform as a function of a selected sampling rate and the determined value (length);
dividing pulses into first subsets, wherein the first subsets are differentiated by each being associated with a sensor;
dividing pulses associated with each sensor into second subsets, wherein the second subsets are differentiated via bullet pulse or muzzle pulse characteristic;
for pulses associated with a sensor:
determining an offset into the synthetic time domain, and
re-characterizing, in creation of the synthetic time domain representation, portions of the waveform at the offset or in a range around the offset.

9. The method of claim 1 wherein pulses are assigned an artificial width in the time domain to facilitate matching under conditions of movement/noise/error associated with a gunshot location system.

10. The method of claim 1 wherein the pulse parameters may be one or more parameters selected from an arrival time, an amplitude, a rise time, a slope, a time-based feature, and/or an angle of arrival.

11. The method of claim 1 wherein the pulse characteristics may include one or more of median power frequency, pulse envelope, angle of arrival, slope, and/or time-based characteristics.

12. The method of claim 1 wherein the time domain representations are generated in reverse-time order.

13. The method of claim 1 wherein the transforming initial gunshot data regarding bullet pulses and/or muzzle pulses associated with one or more sensors into a set of discrete pulses characterized by one or more pulse parameters comprises replacing each bullet pulse and each muzzle pulse with a Gaussian curve centered at a time of arrival for each pulse.

14. The method of claim 1 wherein the one or more pulse parameters comprises an arrival time weighted according to a function of an amplitude of a pulse.

15. The method of claim 1 further comprising de-emphasizing a set of pulses caused by echoes and reverberations.

16. The method of claim 15 wherein de-emphasizing a set of pulses caused by echoes and reverberations comprises:
performing cluster analysis in time domain using a clustering parameter smaller than a time between shots to obtain a set of pulses generated by each shot;
sorting the pulses in a cluster in order of increasing time to obtain a relative ordering of pulses in the cluster;
applying a weight to a first in time pulse in the cluster; and
applying a lesser weight to a later in time pulse such that the later in time pulse is de-emphasized.

17. The method of claim 5 wherein the processing step further comprises creating a reference set of discrete pulses for each of the one or more sensors;
cross-correlating the reference set of discrete pulses for each sensor against each the reference set of discrete pulses for each other sensor; and
selecting the reference set of discrete pulses for which a sum of maximum values of cross-correlation on each pair is maximized.

18. The method of claim 1 further comprising scoring a number of matches that is based on a total number of pulses and channels so that a set of weakly matched pulses are discarded.

19. The method of claim 1 further comprising identifying a gunshot by the matching process; and
validating the gunshot by computing a trial location from a set of pulses associated with the gunshot by computing a trial location from the set of pulses associated with the gunshot and checking that a self-consistent error is less than a threshold.

20. The method of claim 19 further comprising discarding a first channel set of pulses, computing the trial location from the set of pulses associated with the gunshot minus the first channel set of pulses, and checking that a self-consistent error is less than a threshold.

21. One or more computer-readable media containing computer-executable instructions for processing gunshot information to determine correlation of acoustic impulses with associated gunshots in a gunshot sequence, the computer-executable instructions including instructions for:
transforming, by one or more computer processing components, initial acoustic, gunshot signals detected by one or more sensors into a set of discrete pulse data structures characterized by one or more pulse parameters;
dividing the discrete pulses into subsets including a likely bullet pulses subset and a likely muzzle pulses subset, wherein the discrete pulses are divided into subsets as a function of one or more pulse characteristics;
generating, for the subsets, time domain representations of the pulses, wherein the time domain representations include waveforms derived so as to provide a synthesized representation of the acoustic impulses; and
performing a pattern matching process that includes processing the time domain representations to determine alignment between synthesized representations of the acoustic impulses;
determining which acoustic impulses are associated with which shot in the gunshot sequence via the pattern matching process.

22. One or more computer-readable media containing computer-executable instructions for processing gunshot information to determine correlation of acoustic impulses with associated gunshots in a gunshot sequence, the computer-executable instructions including instructions for:
transforming, by one or more computer processing components, initial acoustic gunshot signals detected by one or more sensors into a set of discrete pulse data structures characterized by one or more pulse parameters;
transmitting the transformed discrete pulse data to a central processing component, which performs the steps of:
dividing the discrete pulses into a likely muzzle pulses subset, wherein the discrete pulses are divided as a function of one or more pulse characteristics;
generating, for the subsets, time domain representations of the pulses, wherein the time domain representations include waveforms derived so as to provide a synthesized representation of the acoustic impulses;
performing a pattern matching process that includes processing the time domain representations to determine alignment between synthesized representations of the acoustic impulses; and
determining which acoustic impulses are associated with which shot in the gunshot sequence via the pattern matching process;
wherein, as a result of being configured to correlate impulses against corresponding gunshots without transmitting the original acoustic signal, the computer-readable media enables determination of the acoustic impulses that are associated with each shot of the gunshot sequence via low-bandwidth communications link(s).

23. The computer-readable media of claim 21 or claim 22 wherein the waveform is derived via a Gaussian function of pulse information.

24. The computer-readable media of claim 21 wherein the pulse information includes an absolute arrival time of a pulse and a match window range.

25. The computer-readable media of claim 21 wherein the waveform is derived via a binary 0 or 1 function.

26. The computer-readable media of claim 21 wherein the processing step comprises a comparison of channels or sensors that includes cross-correlation.

27. The computer-readable media of claim 21 wherein a pulse's identity is determined by applying the pulse's offset to a data structure corresponding to a waveform that tracks which pulse was responsible for each sample in the waveform.

28. The computer-readable media of claim 21 wherein the time domain representation is a synthetic time domain representation wherein bullet pulses and muzzle pulses are processed (handled) independently.

29. The computer-readable media of claim 21 wherein pulses are assigned an artificial width in the time domain to facilitate matching under conditions of movement/noise/error associated with a gunshot location system.

30. The computer-readable media of claim 21 wherein the time domain representations are generated in reverse-time order.

31. The computer-readable media of claim 21 wherein the transforming initial gunshot data regarding bullet pulses and/or muzzle pulses associated with one or more sensors into a set of discrete pulses characterized by one or more pulse parameters comprises replacing each bullet pulse and each muzzle pulse with a Gaussian curve centered at a time of arrival for each pulse.

32. The computer-readable media of claim 21 wherein the one or more pulse parameters comprises an arrival time weighted according to a function of an amplitude of a pulse.

33. The computer-readable media of claim 21 further comprising de-emphasizing a set of pulses caused by echoes and reverberations.

34. The computer-readable media of claim 21 further comprising scoring a number of matches that is based on a total number of pulses and channels so that a set of weakly matched pulses are discarded.

35. The computer-readable media of claim 21 further comprising identifying a gunshot by the matching process; and
 validating the gunshot by computing a trial location from a set of pulses associated with the gunshot by computing a trial location from the set of pulses associated with the gunshot and checking that a self-consistent error is less than a threshold.

36. The computer-readable media of claim 22 wherein the pulse information includes an absolute arrival time of a pulse and a match window range.

37. The computer-readable media of claim 22 wherein the waveform is derived via a binary 0 or 1 function.

38. The computer-readable media of claim 22 wherein the processing step comprises a comparison of channels or sensors that includes cross-correlation.

39. The computer-readable media of claim 22 wherein a pulse's identity is determined by applying the pulse's offset to a data structure corresponding to a waveform that tracks which pulse was responsible for each sample in the waveform.

40. The computer-readable media of claim 22 wherein the time domain representation is a synthetic time domain representation wherein bullet pulses and muzzle pulses are processed (handled) independently.

41. The computer-readable media of claim 22 wherein pulses are assigned an artificial width in the time domain to facilitate matching under conditions of movement/noise/error associated with a gunshot location system.

42. The computer-readable media of claim 22 wherein the time domain representations are generated in reverse-time order.

43. The computer-readable media of claim 22 wherein the transforming initial gunshot data regarding bullet pulses and/or muzzle pulses associated with one or more sensors into a set of discrete pulses characterized by one or more pulse parameters comprises replacing each bullet pulse and each muzzle pulse with a Gaussian curve centered at a time of arrival for each pulse.

44. The computer-readable media of claim 22 wherein the one or more pulse parameters comprises an arrival time weighted according to a function of an amplitude of a pulse.

45. The computer-readable media of claim 22 further comprising de-emphasizing a set of pulses caused by echoes and reverberations.

46. The computer-readable media of claim 22 further comprising scoring a number of matches that is based on a total number of pulses and channels so that a set of weakly matched pulses are discarded.

47. The computer-readable media of claim 22 further comprising identifying a gunshot by the matching process; and
 validating the gunshot by computing a trial location from a set of pulses associated with the gunshot by computing a trial location from the set of pulses associated with the gunshot and checking that a self-consistent error is less than a threshold.

* * * * *